United States Patent [19]

Shimizu

[11] Patent Number: 4,560,117
[45] Date of Patent: Dec. 24, 1985

[54] REEL SUPPORTING STRUCTURE IN OPEN REEL TYPE TAPE CASSETTE

[76] Inventor: Tokuzo Shimizu, 2-4-7, Tamagawa-Denenchofu, Setagaya-ku, Tokyo, Japan

[21] Appl. No.: 552,114

[22] Filed: Nov. 16, 1983

[51] Int. Cl.⁴ .................. B65H 75/14; B65H 75/28; G11B 15/32; G11B 23/04
[52] U.S. Cl. ................................ 242/199; 242/71.8; 360/132
[58] Field of Search ............... 242/197, 199, 71.8, 242/71.9; 360/93, 96.1, 132

[56] References Cited

U.S. PATENT DOCUMENTS

| | | | |
|---|---|---|---|
| 4,191,984 | 3/1980 | Tsukidate et al. | 360/132 |
| 4,234,140 | 11/1980 | Van Nie et al. | 242/199 |
| 4,248,393 | 2/1981 | Mogi | 242/199 |
| 4,452,408 | 6/1984 | Sasaki | 242/199 |

*Primary Examiner*—Harvey C. Hornsby
*Assistant Examiner*—Scott J. Haugland
*Attorney, Agent, or Firm*—C. O. Marshall, Jr.

[57] ABSTRACT

A tape cassette comprises a set of two front and back cassette halves, each half having a pair of apertures each of which is surrounded by an inward-extending annular projection and is aligned with an aperture and annular projection on the other cassette half, and a pair of tape reels, each of which has an inner surface surrounding two such aligned annular projections and comprises an annular flange which extends inward from the inner surface of each reel, which forms a step down from each side of the reel, and which is provided with means for engaging a driving shaft. The two aligned annular projections are in supporting engagement with the two sides of the annular flange, and the two sides of each reel are separated by a clearance from the two cassette halves.

3 Claims, 7 Drawing Figures

REEL SUPPORTING STRUCTURE IN OPEN REEL TYPE TAPE CASSETTE

BACKGROUND OF THE INVENTION

A. Field of the Invention

This invention relates to an audio open reel type tape cassette in which a pair of reels are incorporated, and is particularly concerned with a reel supporting structure permitting both sides of the reel to separate from inside of the cassette half for rotation.

B. Description of the Prior Art

Various types of reproducing equipments are provided for the young music-loving, and particularly cassette tape reproducing equipment has become popular for its portability and also in interdependence with a tape performance further improved recently.

A magnetic performance of the tape itself will be taken up first as a factor to influence a tonal quality obtained through the cassette tape reproducing equipment. However, another essential factor is a stable running capacity of the tape. In other words, a smooth running on a slight torque of the reproducing equipment is essential to improve the tonal quality satisfactorily and also to lighten the mechanical burden of the reproducing equipment body.

In a conventional tape cassette, for example, U.S. Pat. No. 4,248,393 issued on Feb. 3, 1981, a pair of hubs is supported rotatably in a cassette case, and a series of tape is wound on the hubs. However, according to this structure, the hubs are rotated with a side of the wound tape rubbed at all times with an inside of the cassette case. Accordingly, a frictional force to prevent rotations of the hubs works on the pair of hubs all the time, and thus the rotations are not smoothed to deteriorate running performance of the tape. To cope with such defect, there exists an art for bringing sides of the hubs and the tape in contact with a synthetic resin film with less frictional resistance which is interposed inside of the cassette case. However, such art comprises after all permitting the tape and the hubs to rub with the synthetic resin film, and though an absolute value of the frictional force decreases in fact, the hubs still do not run smoothly.

Then, an open reel type tape cassette proposed by the same inventors as this invention has come into wide use recently instead of the conventional tape cassette simply winding the tape on the hubs. The open reel type tape cassette is arranged such that, as disclosed, for example, in Japanese Utility Model Publication No. 72772/1983, a pair of annular projections is formed on the inside of a set of cassette halves, a pair of reels on which a series of tape is wound with a reel hub held between a set of metal flanges mounted on the annular projections, the reel hub is placed in position by the annular projections, and then the reels are rotated to run the tape. Such open reel type tape cassette has become popular for its specific design of providing full-scale reels in the cassette with a limited space and surprising aesthetic appearance, however, the situation that the reels run with the side kept rubbing the inside of the cassette half may unavoidably cause a frictional force.

SUMMARY OF THE INVENTION

A principal object of this invention is therefore to obtain an improved open reel type tape cassette.

Another object of this invention is to secure a stable running of the tape.

Further object of this invention is to reduce the frictional force that exists when a pair of reels rotate.

For the above object, the invention comprises keeping ends of annular projections of the cassette half in contact with an inner peripheral step of the reel hub, thereby allowing the reels to rotate with both sides separated from inside of the cassette half.

Further objects and others will be made apparent in detailed description with reference to the accompanying drawings. However, these are nothing but represent embodiments of this invention, which is not necessarily limited thereto.

DETAILED DESCRIPTION OF PREFERRED EMBODIMENTS

The invention will now be described in detail for its preferred embodiments with reference to the accompanying drawings.

Figure 1:
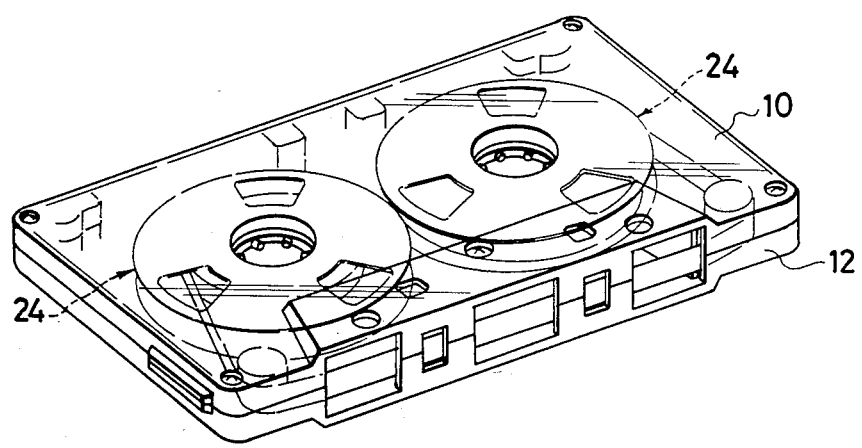
FIG. 1 is a perspective view representing an open reel type tape cassette given in one embodiment of this invention.
Figure 2:
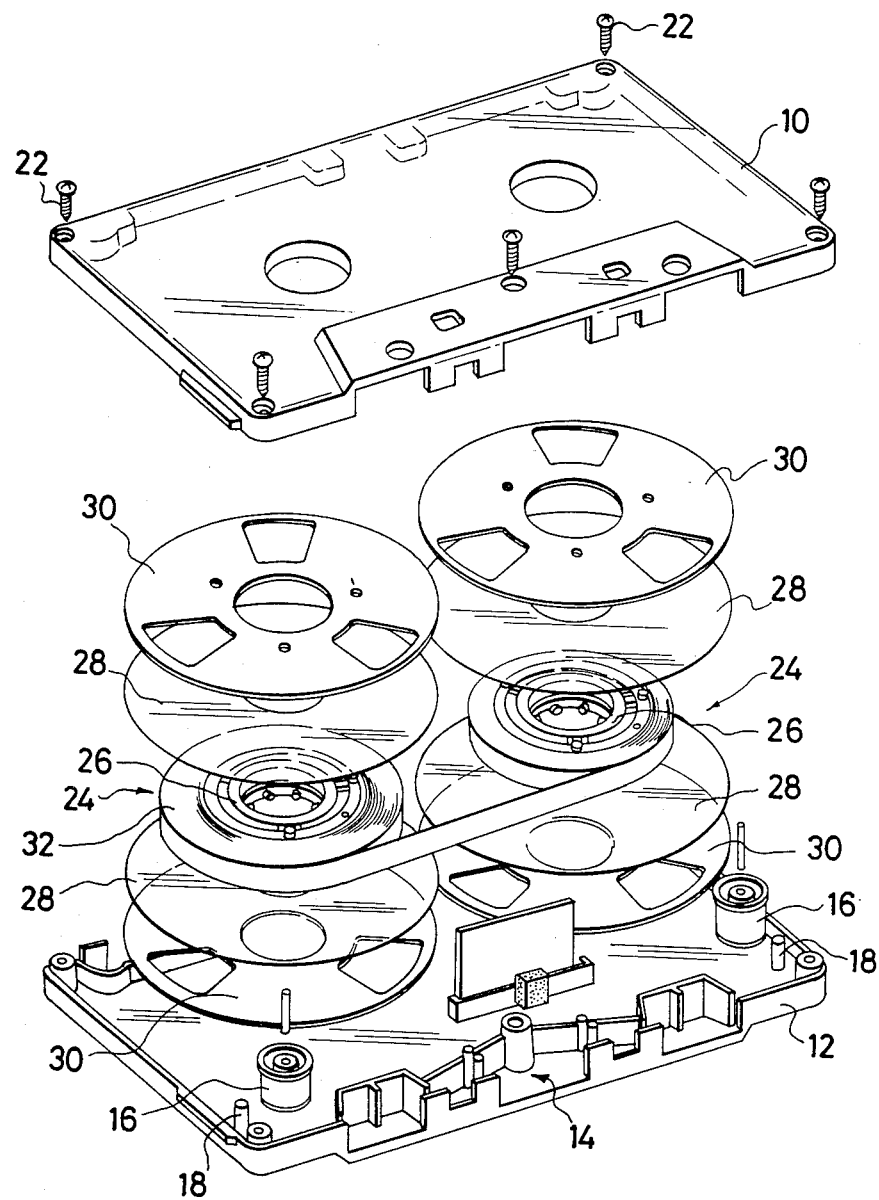
FIG. 2 is an exploded perspective view of the open reel type tape cassette shown in FIG. 1.
Figure 3:
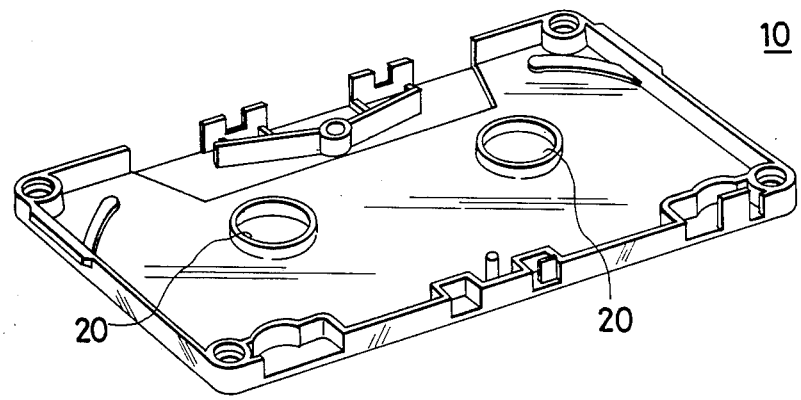
FIG. 3 is a perspective view of one of a set of cassette halves.

In FIG. 1 and FIG. 2, an open reel type tape cassette according to this invention is shown as a whole. A set of front and back cassette halves 10, 12 are so molded to a normalized outline dimension with a transparent or see-through synthetic resin, and a tape guide 14, a guide roller 16 and further a guide pin 18 are formed on the cassette half 12. Then, the cassette half 10 with simpler form is shown in FIG. 3 with its inside upward, and a pair of annular projections 20 are formed at the same interval as the interval (normalized) for rotating shafts of a driving mechanism for reproducing equipment (not illustrated). The annular projections 20 are those for which a wall surface of the cassette half 10 is bent inside at a constant inside diameter. Then, a shape of such annular projection 20 is also exactly the same in the case of the other cassette half 12.

Further, a screw for combining both 10, 12 with a setscrew 22 will be formed on the cassette halves 10, 12 other than the above-mentioned constitution, however, a further description will be omitted for its being related little with a gist of this invention.

A pair of reels 24 are mounted rotatably on the annular projections 20 and rotated by a driving mechanism of reproducing equipment (not illustrated). The reels 24 are those for which a circular metal flange 30 of aluminum or the like is put in a synthetic resin reel hub 26 shown in FIG. 5 through an inner sheet 28 which is transparent and circular resin sheet, and these are unified to wind a series of tape 32 thereon. Then, the reel hub 26 is placed in position by the annular projections 20 of the cassette halves 10, 12, and the reels 24 rotate to run the tape 32 for playback or sound recording.

Figure 4:
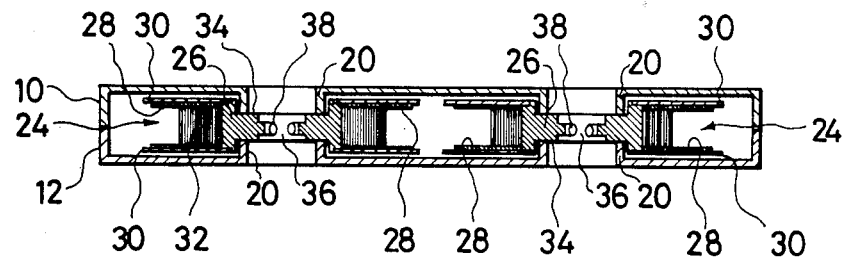
FIG. 4 is a sectional view representing a reel supporting structure relating to this invention.
Figure 5:
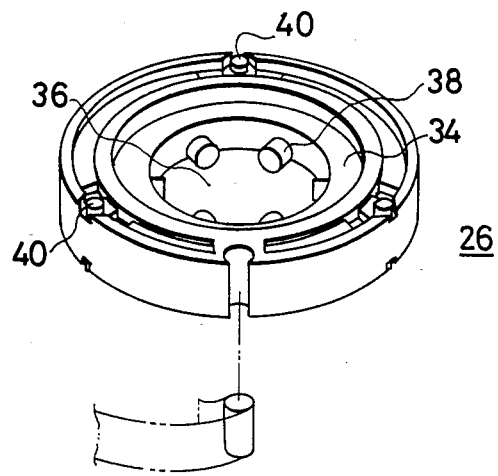
FIG. 5 is a perspective view of the reel hub simplex shown in FIG. 4.

On the premise of the above status as an open reel type tape cassette, this invention particularly assumes a characteristic constitution illustrated in FIG. 4 and FIG. 5. More specifically, the reel hub 26 has an inner peripheral step 34 concave to have a diameter slightly larger than the outside diameter of the annular projection 20 as shown in FIG. 4 formed from both sides on the inside of an outside diameter portion of the large diameter on which the tape 32 is wound. Needless to say, the rotating shaft of the driving mechanism is fitted in a center hole 36 of the inner peripheral step 34, and six pieces of radial projections 38 engage with the rotating shaft to transfer a torque of the driving mechanism to the reels 24 through the reel hub 26. Then, a fitting projection 40 standing upright from a side of the reel hub 26 is that for mounting the metal flange 30 to coupling through heat welding.

In FIG. 4 again, dimensions of the annular projections 20 of the cassette halves 10, 12 and the inner peripheral step 34 of the reel hub 26 are set as follows. The annular projections 20 are set comparatively high, the ends come in contact with the inner peripheral step 34, and in this case both sides of the reel 24 or outermost side of the metal flange 30 is separated from inside of the cassette halves 10, 12, thus allowing a clearance. Accordingly, the reels 24 will never contact with the ends of the annular projections 20 at a portion other than the inner peripheral step 34 of the reel hub 26, and therefore, a frictional force to prevent rotations will hardly arise at the time of running. This is effective to decrease a rotation resistance considerably as compared with a conventional tape cassette wherein a side of the tape or the hub is kept rubbing the inside of the cassette half all the time.

According to the reel supporting structure of this invention, a running performance of the tape is stabilized sufficiently without requiring a sliding sheet or the like, and thus a music with fine tonal quality can be enjoyed for a long time.

Figure 6:
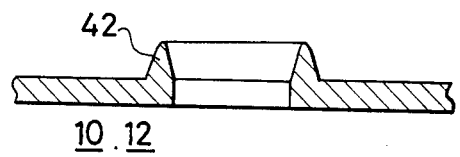
FIG. 6 is a fragmentary sectional view representing an example of an annular projection of the cassette hub.

Next, another embodiment of this invention will be taken up for description. A rotation resistance of the reels hardly arises according to the reel supporting structure of the above embodiment, however, the inner peripheral step 34 and the end of the annular projection 20 are still kept in contact with each other in an appreciable area all the time. In other words, the end of the annular projection 20 is flat, and the inner peripheral step 34 is also left flat. Now, therefore, annular projections 42 of the cassette halves 10, 12 which are shown fragmentarily in FIG. 6 have the ends kept pointed instead of flat. The ends are made circular arc partly and taperingly or acute-angled. For adopting such pointed shape on the ends, factors of feasibility of a resin molding and wear resistance in a use for a long time will have to be taken into consideration. It goes without saying that a contact area with the reel 24 can be decreased further by keeping ends of the annular projections 42 pointed in shape as described, thus securing smooth rotations.

Figure 7:
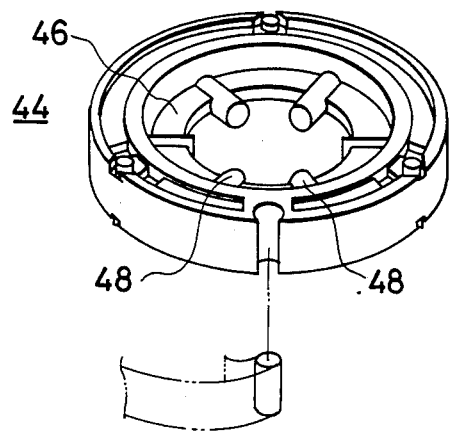
FIG. 7 is a perspective view representing another example of the reel hub.

The invention will be described otherwise for further embodiment with reference to FIG. 7. A contrivance is then made so as to decrease a contact area on the side of a reel hub 44. More specifically, regular projections 48 are formed in the direction of the hub 44 side at positions where a circumference of an inner peripheral step 46 of the reel hub 44 is divided in equal parts, and the projections 48 come in contact with the annular projections 20 of the cassette halves 10, 12. The projections 48 can be given in any selected shapes, however, it is preferable that radiate projections 50 engaging with the driving mechanism be enlarged as they are and then extended radially to swell from the inner peripheral step 46. The contact area with the annular projections 20 will further be decreased, and a burden of the driving mechanism can be minimized thereby.

It will be then understood that variations and applications can be effected in various ways for the invention, which may be practiced otherwise than as specifically illustrated and described.

What is claimed is:

1. A tape cassette comprising a set of two front and back cassette halves, each half having a pair of apertures each of which is surrounded by an inward-extending annular projection and is aligned with an aperture and annular projection on the other cassette half, and a pair of tape reels having opposed sides, each of which surrounds two such aligned annular projections, wherein the improvement comprises a pair of inner peripheral steps which extends inward from each reel, and which is provided with means for engaging a driving shaft, said two aligned annular projections being in supporting engagement with the pair of inner peripheral steps, and the two sides of each reel being separated by a clearance from the two cassette halves.

2. A tape cassette according to claim 1 wherein the annular projections are wedge-shaped in section.

3. A tape cassette according to claim 1 wherein each pair of inner peripheral steps is provided on both sides with evenly-spaced regular projections, affording a reduced area of contact with the annular projections.

* * * * *